US010591093B2

(12) United States Patent
Baburao et al.

(10) Patent No.: US 10,591,093 B2
(45) Date of Patent: Mar. 17, 2020

(54) FLUID CONVEYING APPARATUS

(71) Applicant: JAIN IRRIGATION SYSTEMS LIMITED, Jalgaon (IN)

(72) Inventors: Patil Mahesh Baburao, Jalgaon (IN); Jain Ajit Bhavarlal, Jalgaon (IN); Cohen Tomer, Jalgaon (IN)

(73) Assignee: JAIN IRRIGATION SYSTEMS LIMITED, Jalgaon (IN)

(*) Notice: Subject to any disclaimer, the term of this patent is extended or adjusted under 35 U.S.C. 154(b) by 0 days.

(21) Appl. No.: 15/315,873

(22) PCT Filed: Jun. 3, 2015

(86) PCT No.: PCT/IN2015/000229
§ 371 (c)(1),
(2) Date: Dec. 2, 2016

(87) PCT Pub. No.: WO2015/186142
PCT Pub. Date: Dec. 10, 2015

(65) Prior Publication Data
US 2017/0205002 A1     Jul. 20, 2017

(30) Foreign Application Priority Data
Jun. 3, 2014    (IN) .......................... 1826/MUM/2014

(51) Int. Cl.
*F16L 11/22*     (2006.01)
*A01G 25/02*     (2006.01)
(Continued)

(52) U.S. Cl.
CPC .............. *F16L 11/22* (2013.01); *A01G 25/02* (2013.01); *B29C 48/09* (2019.02); *B29C 48/11* (2019.02); *B29C 48/19* (2019.02); *B29C 48/20* (2019.02); *F16L 11/04* (2013.01); *B29C 48/022* (2019.02); *B29K 2023/06* (2013.01); *B29L 2023/005* (2013.01); *B29L 2031/606* (2013.01); *B29L 2031/7004* (2013.01)

(58) Field of Classification Search
CPC ....... A01G 25/02; A01G 25/023; F16L 11/04; F16L 11/22; B05B 1/20; B05B 1/202
See application file for complete search history.

(56) References Cited

U.S. PATENT DOCUMENTS 3,667,685 A     6/1972   Rinkewich
3,698,195 A *  10/1972  Chapin ................. A01G 25/02
                                                      138/114
(Continued)

FOREIGN PATENT DOCUMENTS

WO       2001031999       5/2001

*Primary Examiner* — Christopher S Kim
(74) *Attorney, Agent, or Firm* — FisherBroyles, LLP; J. David Smith

(57) ABSTRACT

A fluid conveying apparatus is disclosed. The apparatus comprises a circular tubing. The circular tubing further comprises an internal surface and an external surface. The internal surface encloses a circular passage for conveying a fluid and the external surface is disposed concentric to the internal surface, and distal to the circular passage. Further, the circular tubing comprises a plurality of channels disposed along a periphery of the circular tubing sandwiched between the internal surface and the external surface.

6 Claims, 7 Drawing Sheets

(51) Int. Cl.
*B29C 48/09* (2019.01)
*B29C 48/11* (2019.01)
*B29C 48/20* (2019.01)
*B29C 48/19* (2019.01)
*F16L 11/04* (2006.01)
*B29L 31/60* (2006.01)
*B29L 31/00* (2006.01)
*B29L 23/00* (2006.01)
*B29C 48/00* (2019.01)

(56) References Cited

U.S. PATENT DOCUMENTS

| | | | |
|---|---|---|---|
| 4,474,330 A | | 10/1984 | Langa |
| 5,052,625 A | * | 10/1991 | Ruskin .................. A01G 25/023 |
| | | | 239/542 |
| 5,688,072 A | | 11/1997 | Meyer et al. |
| 5,765,598 A | * | 6/1998 | Goddard .................... F16L 9/12 |
| | | | 138/115 |
| 6,220,079 B1 | | 4/2001 | Taylor et al. |
| 7,025,580 B2 | | 4/2006 | Heagy et al. |
| 2003/0057301 A1 | | 3/2003 | Cohen |
| 2012/0085455 A1 | | 4/2012 | Loebinger et al. |

* cited by examiner

US 10,591,093 B2

FLUID CONVEYING APPARATUS

CROSS REFERENCE TO RELATED APPLICATIONS

The present application is a National Stage Application which claims priority under 35 U.S.C. § 120 from co-pending PCT Application No. PCT/IN2015/000229, filed Jun. 3, 2015, which in turn claims priority from Indian Application No. 1826/MUM/2014, filed Jun. 3, 2014. Applicant claims the benefits of 35 U.S.C. § 120 as to the PCT application and priority under 35 U.S.C. § 119 as to the said Indian application, and the entire disclosures of both applications are incorporated herein by reference in their entireties.

TECHNICAL FIELD

The present invention relates to fluid conveying apparatuses and more particularly with apparatuses with channels in the periphery.

BACKGROUND

Numerous fluid conveying or transmitting apparatuses whose primary objective is to transmit fluid or media, have been well known and are available in numerous shapes, sizes and configurations. The conventional apparatuses recognized in the prior art are all mostly built on the solid wall thickness principle. Kinking is a problem with conventional pipes and tubes. Kinking causes internal area obstruction to the flowing fluid or media, which results in a pressure drop and ultimately uneven flow. This uneven flow will further result in unequal fluid supply to any external point. Kinking can be reduced by increasing the thickness of the walls of the pipes or tubes, but again this solution comes with an increase in cost for the pipes and tubes and issues with flexibility and stiffness.

Therefore, the above mentioned problems associated with the conventional fluid conveying apparatuses have to be alleviated.

SUMMARY

This summary is provided to introduce aspects related to a fluid conveying apparatus and the aspects are further described below in the detailed description. This summary is not intended to identify essential features of the claimed subject matter nor is it intended for use in determining or limiting the scope of the claimed subject matter.

In one implementation a fluid conveying apparatus is disclosed. The apparatus may comprise a circular tubing. The circular tubing may further comprise an internal surface and an external surface. The internal surface may further enclose a circular passage for conveying a fluid. The external surface may further be disposed concentric to the internal surface and distal to the circular passage. The apparatus may further comprise a plurality of channels disposed along a periphery of the circular tubing, and sandwiched between the internal surface and the external surface. The plurality of channel may extend parallel to a longitudinal axis of the circular tubing. The fluid conveying apparatus may further comprise a dripper mounted within the circular tubing. The dripper and the circular tubing may be co-extruded.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present subject matter discloses a fluid conveying apparatus to allow for a fluid to flow in a drip irrigation system.

Figure 1:
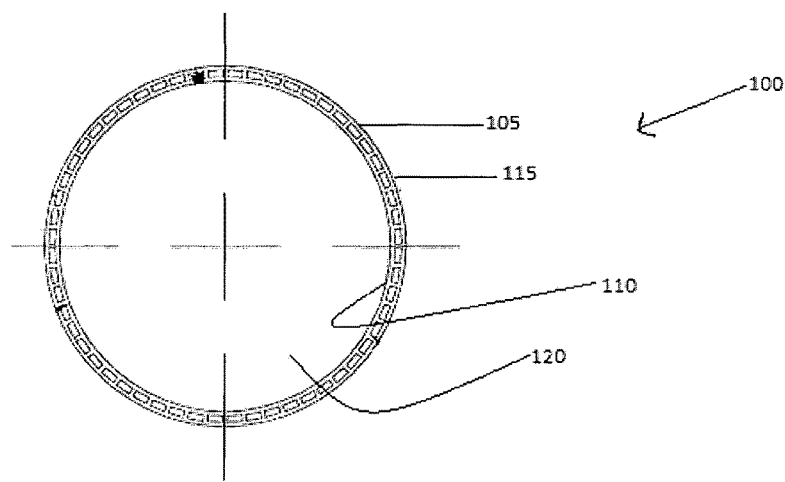
FIG. 1 shows a cross sectional view of a fluid conveying apparatus
Figure 2:
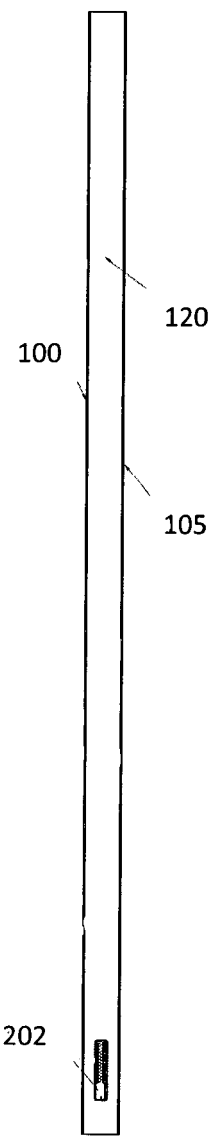
FIG. 2 shows a longitudinal sectional view of the apparatus

Referring to FIG. 1 shows a cross sectional view of a fluid conveying apparatus 100 and FIG. 2 shows a longitudinal sectional view of the apparatus 100 along with a dripper. As illustrated in FIG. 1 and FIG. 2, the apparatus 100 comprises a circular tubing 105 comprising an internal surface 110 and an external surface 115. A circular passage 120 is enclosed by the internal surface 110 and is the fluid conveying passage through which the required fluid or media is transmitted. The diameter of the circular passage 120 is representative of the net internal diameter through which the fluid flows. The external surface 115 is positioned such that it is concentric to the internal surface 110. Drippers 202 are inserted in to the apparatus during co-extrusion for discharging the fluid/media.

The circumference of the circular tubing 105 comprises a plurality of channels sandwiched between the internal surface and the external surface, as illustrated in FIG. 1. The circular tubing 105 may further comprise a dripper 202 mounted with the circular tubing. The dripper can be mounted during a co-extrusion process or at later stage during the installation of the apparatus.

Referring to FIGS. 3, 4, 5, 6 and 7 show cross-sectional views of the apparatus with a first, second, third, fourth and fifth arrangement of channels along the circumference of the circular tubing of the apparatus. These channels are disposed longitudinally along the periphery such that they run parallel to the longitudinal axis of the tubing. The apparatus is made of flexible plastic material. The channels are hexagonal channels or elongated channels, the elongated portion of the plurality of channels disposed along a circumference of the circular tubing. The pluralities of channels are continuous without any opening to the internal surface 110 or the external surface 115. The hollow section or channels do not carry any fluid in them.

Figure 3:
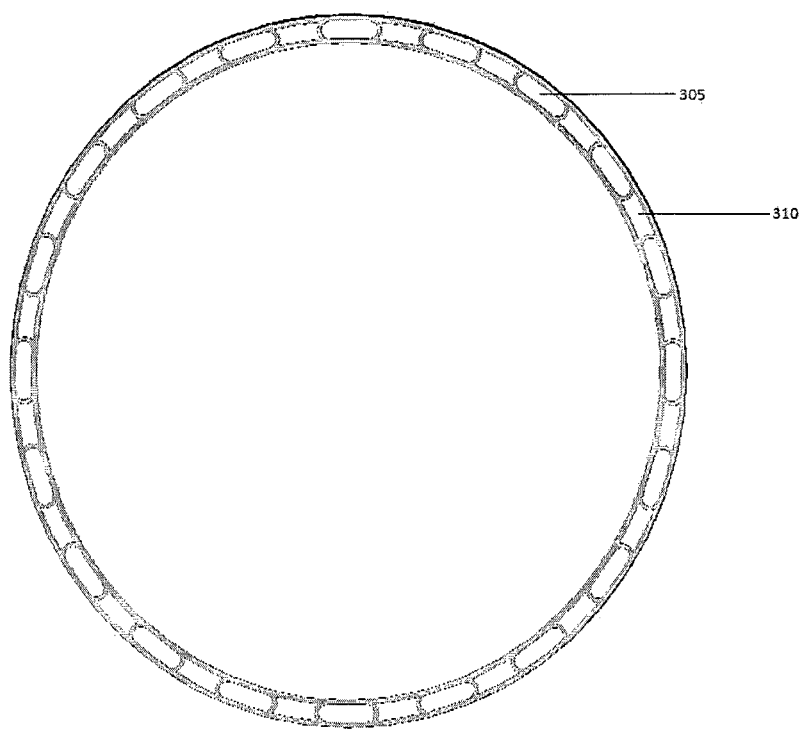
FIG. 3 shows a cross-sectional view of the apparatus with a first arrangement of channels disposed along a circumference of a circular tubing of the apparatus

FIG. 3 shows a cross-sectional view of the apparatus with a first arrangement of the plurality of channels disposed along the circumference of the circular tubing, the plurality of channels further comprising a set of first channels 305 and second channels 310 in an alternate fashion. The first channels 305 comprise rectangular channels having bulging sides and the second channels 310 comprise rectangular channels with inwardly extending sides corresponding to a bulging side of an adjacent first channel.

Figure 4:
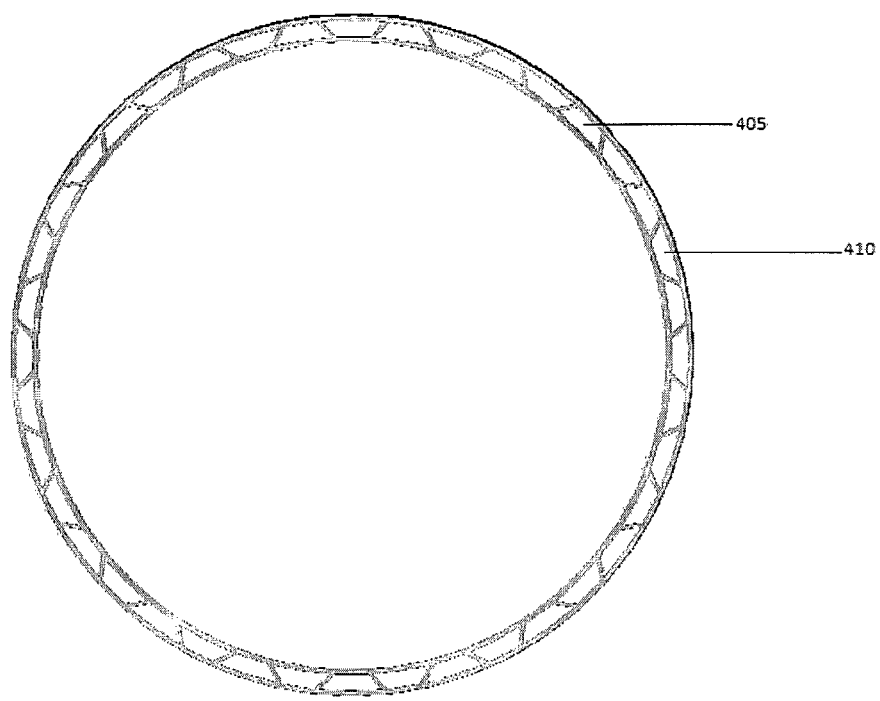
FIG. 4 shows a cross-sectional view of the apparatus with a second arrangement of channels disposed along a circumference of the circular tubing of the apparatus

FIG. 4 shows a cross-sectional view of the apparatus with a second arrangement of the plurality of channels disposed along the circumference of the circular tubing, comprising a set of first channels 405 alternating with a set of second channels 410. The first channels 405 comprise trapezoidal channels and the second channels 410 comprise trapezoidal channels inverted in orientation corresponding to an adjacent first channel.

Figure 5:
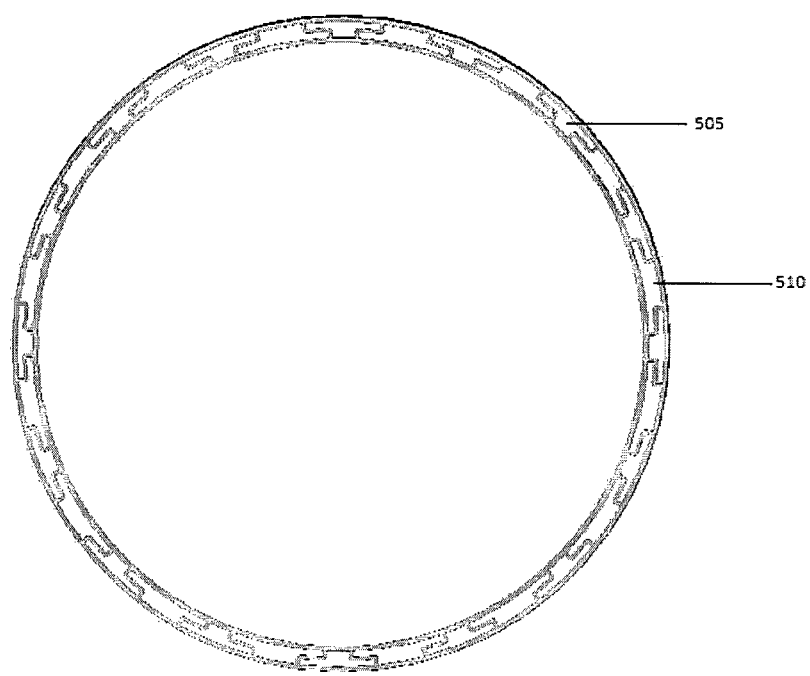
FIG. 5 shows a cross-sectional view of the apparatus with a third arrangement of channels disposed along a circumference of the circular tubing of the apparatus

FIG. 5 shows a cross-sectional view of the apparatus with a third arrangement of the plurality of channels disposed along the circumference of the circular tubing, comprising a set of first channels 505 alternating with a set of second channels 510. The first channels 505 comprise t-shaped polygonal channels and second channels 510 comprise t-shaped polygonal channel inverted in orientation corresponding to an adjacent first channel.

Figure 6:
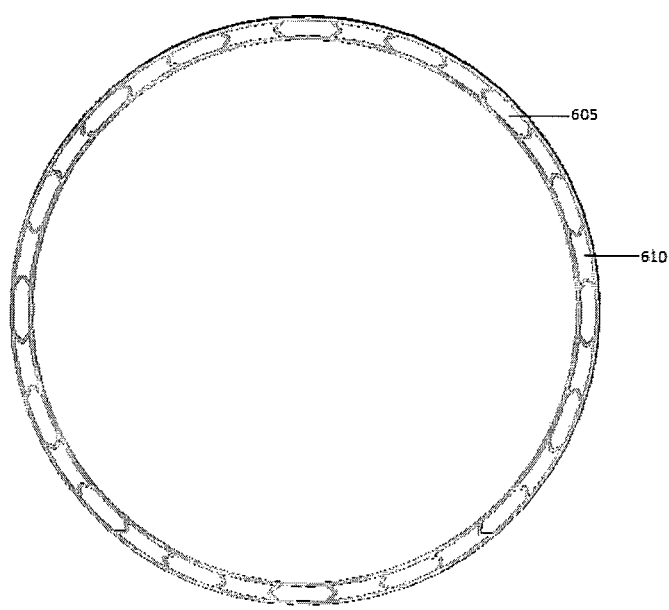
FIG. 6 shows a cross-sectional view of the apparatus with a fourth arrangement of channels disposed along a circumference of the circular tubing of the apparatus

FIG. 6 shows a cross-sectional view of the apparatus with a fourth arrangement of the plurality of channels disposed along the circumference of the circular tubing, comprising a set of first channels 605 alternating with a set of second channels 610. The first channels 605 comprise elongated hexagonal channels and the second channels 610 comprise rectangular channels with inwardly extending sides corresponding to a side of an adjacent first channel.

Figure 7:
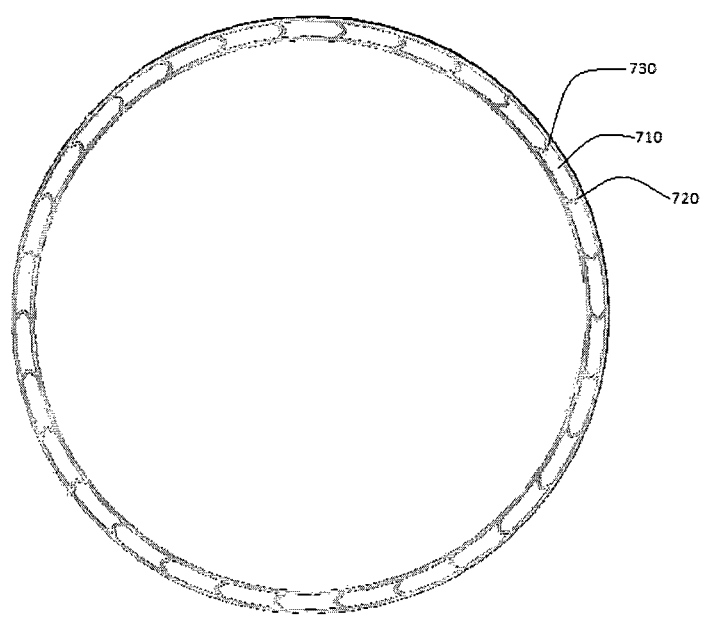
FIG. 7 shows a cross-sectional view of the apparatus with a fifth arrangement of channels disposed along a circumference of the circular tubing of the apparatus

FIG. 7 shows a cross-sectional view of the apparatus with a fifth arrangement of the plurality of channels disposed along the circumference of the circular tubing wherein the elongated channels 710 are rectangular with a first side 720 extending outwardly in a tapering conical form and a second side 730 extending inwardly, the second side opposite to the first side of the elongated channel and wherein the elongated channels 710 are arranged in series wherein the first side of an elongated channel is disposed proximal to the second side of an adjacent elongated channel.

Advantageously, the various configurations of the channels in the circular tubing as described above reduce the overall cost of the apparatus due to conservation of raw material. The external surface 115 of the apparatus 100 includes coextruded strip lines. In addition, drippers are inserted into the apparatus during extrusion or can be mounted above it during the installation of the apparatus as the purpose of the requisite application demands. Co extrusion of drippers is for regulating the discharge of the fluid/media through the apparatus by using the dripper of required specifications. The dripper can be of any shape and it is co extruded at regular intervals or in a continuous form.

The apparatus 100 is composed of flexible plastic material called polyethylene in order to provide the added advantage of flexibility for ease of transmittance of the fluid. Other materials, which have similar properties, can be employed in the apparatus.

In a preferred embodiment, the fluid conveying apparatus is used for irrigation purposes wherein the external application is watering plants or crops. The anti-kinking and other advantageous properties results in conservation of water, and even flow of water increases the productivity and yield of the crop.

The presence of channels in the circumference of the tubing provides anti-kinking properties and improves flexibility and stiffness thereby enhancing the properties of the apparatus. Advantageously, the enhanced properties gets converted to improved product life and performance of the apparatus as compared to already existing apparatuses. The other benefits include reduced product cost, conservation of raw material, conservation of natural resources and improved productivity. Coextrusion of strip lines on the external surface is different from coextrusion of drippers. Strip lines provide the benefit of aesthetics or color coding. Strip lines are coextruded continuous on the external surface.

We claim:

1. A fluid conveying apparatus comprising:
    a circular tubing, wherein the circular tubing further comprises an internal surface and an external surface, the internal surface encloses a circular passage for conveying a fluid and the external surface is disposed concentric to the internal surface, and distal to the circular passage;
    a plurality of channels disposed longitudinally along a circumference of the circular tubing sandwiched between the internal surface and the external surface, wherein the plurality of channels comprise a set of first channels (305, 405, 505, 605) alternating with a set of second channels (310, 410, 510, 610), wherein the first set of channels have a pre-defined geometric shape and the set of second channels have the pre-defined geometric shape complementary to an adjacent first channel; and
    a dripper mounted within the circular tubing, wherein the dripper and the circular tubing are co-extruded.

2. The fluid conveying apparatus as claimed in claim 1, wherein the plurality of channels extends parallel to a longitudinal axis of the circular tubing.

3. The fluid conveying apparatus as claimed in claim 1, wherein the pre-defined geometric shape are selected from at least one of a rectangular shape with a bulge, and a trapezoidal shape, and a t-shaped polygon, and a polygon.

4. The fluid conveying apparatus as claimed in claim 1, wherein the external surface further comprises a plurality of coextruded strip lines.

5. The fluid conveying apparatus as claimed in claim 1, wherein the apparatus is formed of a flexible plastic material.

6. The fluid conveying apparatus as claimed in claim 5, wherein the flexible plastic material is poly-olefins.

* * * * *